United States Patent [19]
Tidiere et al.

[11] Patent Number: 5,163,330
[45] Date of Patent: Nov. 17, 1992

[54] APPARATUS FOR TESTING AN ELONGATED CONDUIT USING AN INTERNALLY APPLIED NON DESTRUCTIVE WALL DEFORMATION

[75] Inventors: Alain Tidiere, Saint Quay Portrieux; Dominique Prin, Vaulx En Velin, both of France

[73] Assignees: Dune Travaux Specialises; Societe Anonyme de Gestion des Eaux de Paris (SAGEP), France

[21] Appl. No.: 815,523

[22] Filed: Jan. 2, 1992

Related U.S. Application Data

[62] Division of Ser. No. 502,529, Mar. 30, 1990, Pat. No. 5,101,667.

[30] Foreign Application Priority Data

Apr. 4, 1989 [FR] France .................. 89 004651

[51] Int. Cl.$^5$ .............................................. G01N 3/20
[52] U.S. Cl. ........................................ 73/849; 33/523; 73/866.5
[58] Field of Search .............. 73/849, 786, 788, 865.9, 73/866.5; 33/523, 544–544.3

[56] References Cited

U.S. PATENT DOCUMENTS

| | | | |
|---|---|---|---|
| 2,283,730 | 5/1942 | Gardner | 73/849 |
| 2,923,062 | 2/1960 | Auvil | 33/544.3 X |
| 3,495,340 | 2/1970 | Bunnell | 73/786 |
| 3,568,326 | 3/1971 | Dodds | 33/1 H X |
| 3,641,678 | 2/1972 | Murphey, Jr. et al. | 33/544 |
| 3,755,908 | 9/1973 | Ver Nooy | 33/544.3 |
| 4,186,494 | 5/1980 | Edouard et al. | 33/544.3 |
| 4,710,710 | 12/1987 | Flora et al. | 73/866.5 X |
| 4,780,962 | 11/1988 | Smith | 33/523 |
| 4,807,484 | 2/1989 | Goedocke | 73/866.5 X |
| 5,092,056 | 3/1992 | Deaton | 33/544.3 X |

*Primary Examiner*—Tom Noland
*Attorney, Agent, or Firm*—Wall and Roehrig

[57] ABSTRACT

A method for non-destructive evaluation of a conduit, gallery or similar structure as shown which involves mechanical tests using an apparatus for applying forces to the walls of the structure in one or two opposite directions and measuring the displacement and or deformation resulting from the application of the forces. The applied forces and the displacements are measured, received, processed and stored in memory for further processing analysis and diagnosis to determine the condition of the structure over the length evaluated. A suitable expert computer system is utilized to establish the overall condition of the structure and classify the structure into zones of risk for maintenance and or repair.

5 Claims, 3 Drawing Sheets

APPARATUS FOR TESTING AN ELONGATED CONDUIT USING AN INTERNALLY APPLIED NON DESTRUCTIVE WALL DEFORMATION

This is a division of application Ser. No. 502,529, filed Mar. 30, 1990 and now U.S. Pat. No. 5,106,667.

BACKGROUND OF THE INVENTION

The present invention relates to a method enabling diagnoses to be performed simply, effectively and quickly of the condition of existing civil engineering works, such as conduits and galleries subjected over time to stresses which may cause either localized degradations (adversely affecting their use) or generalized disturbances which may range from the presence of wide-open cracks to complete destruction, in order to perform the making of a diagnosis of the condition of the said structures by establishing a law on overall properties to ensure the reliable and efficient inspection and/or servicing and/or repair; it also relates to equipment enabling the said method to be implemented.

It is well known that civil engineering works, such as conduits or galleries allowing, for example, the supply of drinking water or any other consumer product, the disposal of effluent, road or railway tunnels ..., are based on materials which age with time as a result of the physicochemical attacks centered on them, of the modifications of the conditions of use and of any changes in the features of the surrounding ground, and that the stresses to which they are subjected may give rise to more or less substantial localized degradations which therefore require not only inspection but also servicing and reconditioning.

To date, the maintenance and servicing of such structures is based on a method which, in a general manner, consists of visual observation and non-destructive auscultations enabling the quality or homogeneity of the lining or of the surrounding soil to be assessed. In order to perform such non-destructive auscultations, methods are used making use of ultrasonics, radar, acoustics, gamma radiometry .... These methods, however, have the disadvantage of being unable to draw a reliable conclusion about the safety offered by the structure. Consequently, they are completed by destructive tests which consist, in a general manner, in taking samples and subsequent laboratory analysis.

None of the methods proposed to date, however, are entirely satisfactory since they take a long time and are awkward to implement, in particular when underground conduits are concerned.

SUMMARY OF THE INVENTION

Now a simple and economical method which enables these disadvantages to be overcome has been discovered, which forms the subject of the present invention and which requires, for its implementation, only a piece of equipment, which also forms part of the invention, of a simple design, which is particularly reliable and which may be employed equally well in the case of structures having dimensions and/or shapes of a variable crosssection.

Moreover, the method according to the invention enables measurements to be obtained which are processed in order to establish a law on the overall mechanical properties of the structure tested and a conclusion to be drawn on the degree of actual safety of the structure so as to determine the action required for its maintenance (specific inspection, reinforcement, reconstruction ...).

In a general manner, the invention therefore relates to a method enabling a diagnosis to be made of the condition of existing structures, such as conduits, galleries ..., with a view to ensuring servicing and maintenance, which consists:

in collecting information visually on site, which not only enables this site to be reconnoitred but also the apparent state of degradation of the structure to be determined in a overall manner;

in performing a non-destructive evaluation enabling the condition of the conduit or gallery to be assessed, which evaluation is effected by means of mechanical tests performed intermittently along the structure and inside the latter, wherein the said mechanical tests consist in exerting against the inner walls of the structure, in one or two directions, opposite forces with a known determined intensity which may be applied successively increasingly and then decreasingly, and in measuring the resulting deformations and/or displacements at at least two distinct points on the evaluated structure. The intensity of these increasing and decreasing forces generally cause elastic and now destructive deformations and/or displacements of the structure being tested According to an embodiment of the method according to the invention, the forces are exerted on the walls in two opposite directions and the resulting deformations and/or displacements are measured at at least two diametrically opposite points of the structure.

As a result of such a method, it is possible, after identifying the structure, to obtain, by means of the results of these tests performed on site by nondestructive evaluation, using a multiparametric analysis, a classification of the length of the evaluated structure into zones of increasing risk (for example zones classified by four levels of risk: 0,1,2,3). Depending on the type of conduit being evaluated and on the degree of risk discovered, it is therefore possible to deduce the operations to be undertaken on the structure, which operations may range from simple maintenance up to complete repair.

The invention also relates to a piece of equipment enabling the abovementioned method to be implemented and more particularly a piece of equipment which enables the mechanical tests to be made enabling the non-destructive evaluated according to the invention.

This piece of equipment essentially comprises:

a unit (carriage or equivalent element) having a structure and dimensions which enable it to be introduced and displaced inside the structure (conduit) to be evaluated, this carriage supporting means (designated in the remainder of the description by the expression "loading system") which enable forces to be exerted on the walls of the structure in two opposite directions;

means enabling the displacements and deformations which result from the action of the abovementioned forces to be measured at at least two distinct points; and means, preferably mounted on the abovementioned carriage (but which could also be mounted on an additional carriage) and which enable the forces applied and the displacements and deformations measured to be received, memorized and processed, with a view to processing and analysis enabling a diagnosis to be made of the condition of the length of the structure, a law on the overall concerning the properties of the structure to be established by an expert computer system, and the evaluated structure to be classified into zones at risk, and optionally the operations for maintaining the structure to be defined.

Advantageously and in practice:

the means enabling the forces to be exerted against the walls essentially consist of a unit having a double-action thrustor exerting its action on two movable elements, in the form of shoes, and which are applied against the walls of the structure over a sector-shaped zone;

the means enabling the displacements and deformations which result from the forces exerted to be measured consist of a unit in the form of a telescopic rod which can be displaced independently of the carriage and having electronic sensors; an additional system for measuring the displacements and deformations in the horizontal direction is preferably combined with the abovementioned measuring system which is used, for its part, in the vertical direction; these units are, as mentioned above, independent of the carriage carrying the loading system and may be positioned arbitrarily and be multiplied as desired.

DESCRIPTION OF THE DRAWINGS

The invention and the advantages which it brings will, however, be better understood from the embodiment given hereinafter as a guide, but with no limitation being implied, the three attached diagrams illustrating a horizontal loading seen from the front (FIG. 1), a vertical loading seen from the front (FIG. 2) and, in side view (FIG. 3), a type of equipment which enables the mechanical tests in accordance with the method according to the invention to be carried out.

DETAILED DESCRIPTION OF A PREFERRED EMBODIMENT

As indicated above, in the method according to the invention enabling a diagnosis to be made of the condition of structures such as conduits, galleries ..., a non-destructive evaluation is carried out on the structure by means of mechanical tests performed intermittently along the structure and inside the latter, the said tests consisting in exerting opposite forces on the inner walls of the structure and in measuring the resulting deformations and displacements at at least two distinct points.

Figure 1:
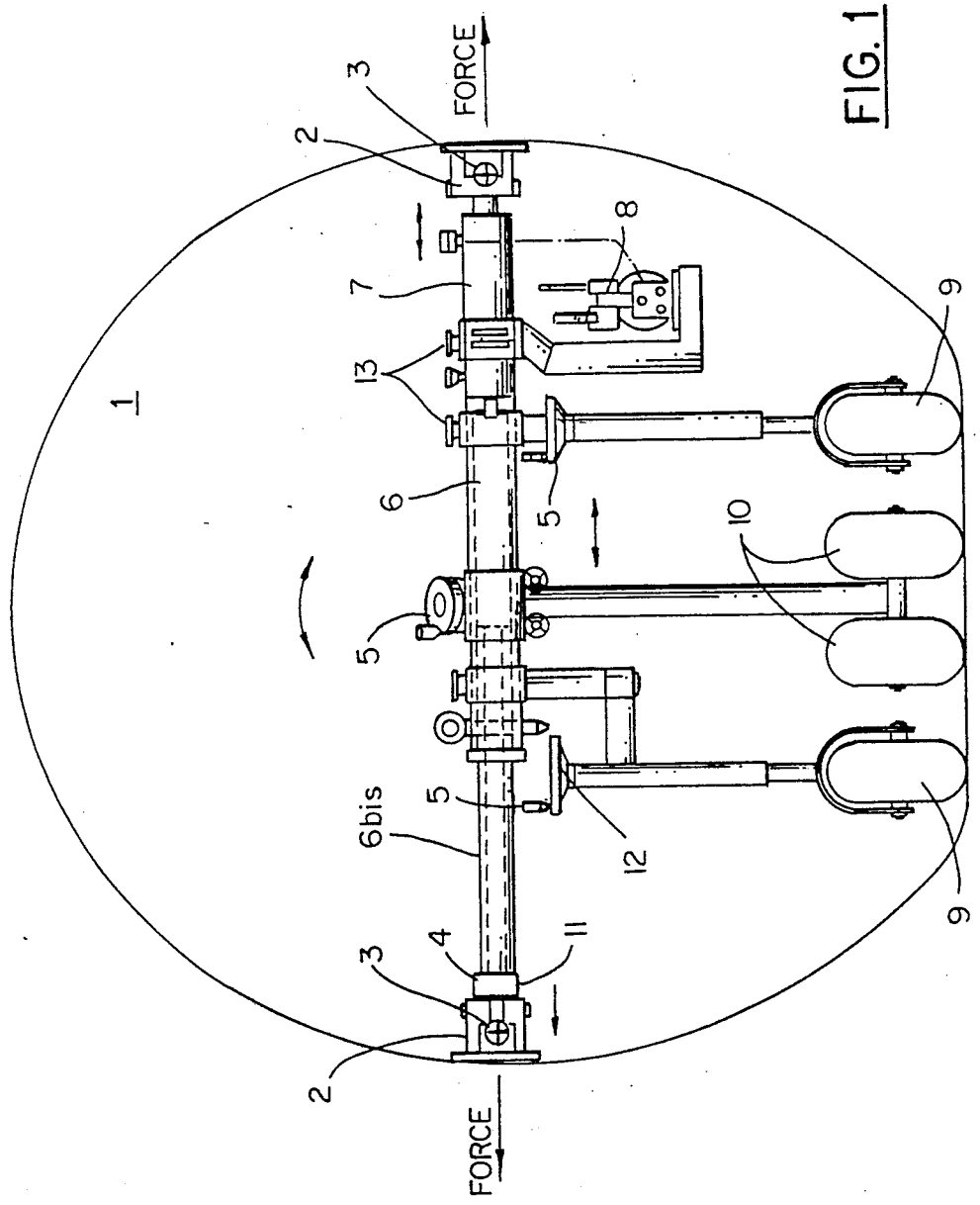
Figure 2:
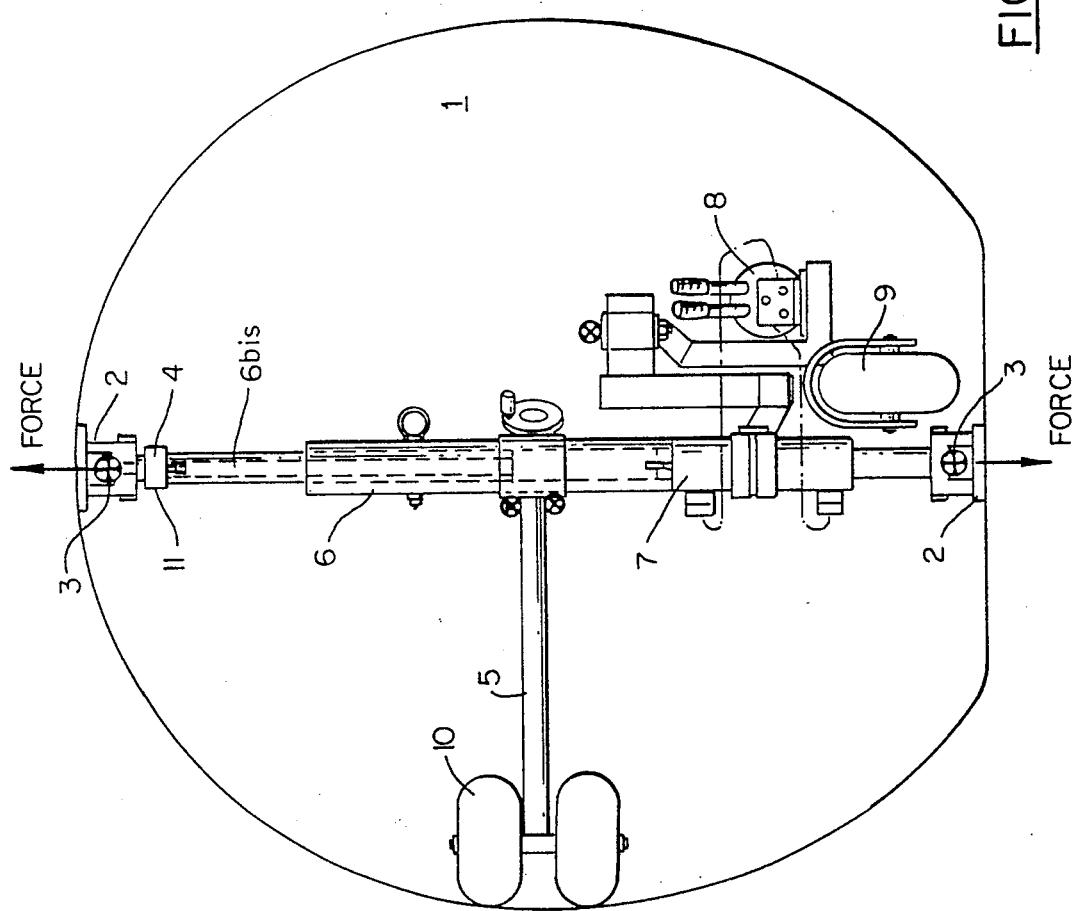
Figure 3:
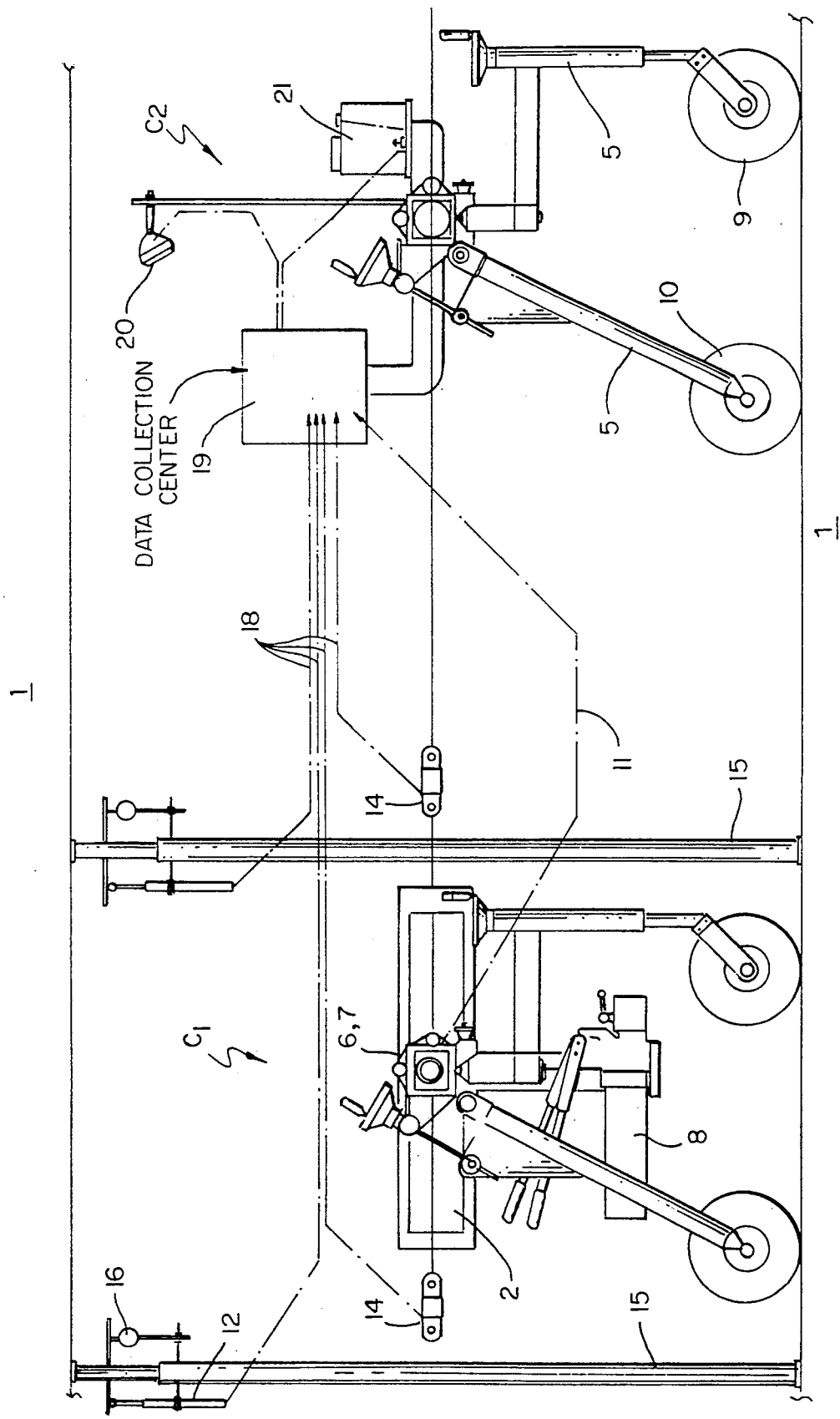

In order to do this, a unit is used such as that illustrated in FIGS. 1, 2 and 3 designed so as to be able to be introduced and displaced inside the structure to be evaluated.

This unit consists, in the embodiment illustrated, essentially of two carriages designated by the general reference (C1) and (C2) respectively. The system enabling the opposite forces to be exerted on the inner walls of the structure (unit termed "loading system") is mounted on the carriage (C1) termed "main carriage". The carriage (C2) (termed "additional carriage") for its part supports the data-collection and -processing and power center and means enabling the displacements and deformations produced to be measured. This embodiment with two separate carriages (C1, C2) is not, however, limiting and it could be possible to envisage having only one carriage supporting the unit with the abovementioned means.

In the embodiment illustrated, the carriage (C1) is in the form of a unit comprising a central body (2,3,4,6,6bis and 7) mounted on means which consist in the present instance of a set of three legs, designated by the reference (5), carrying wheels (9 and 10). The set of legs (5) is designed such that the level of the wheels and/or the distance between them may be modified depending on the conduits inside which the equipment is intended to be displaced.

In the embodiment illustrated, the central body (2,3,4,6,6bis and 7) and the set of legs (5) consist of removable elements and the wheels (9 and 10) are mounted on the legs (5) such that they may be adjusted both horizontally and vertically, in order to enable the equipment to be set tightly inside conduits with any type of profile. These adjustment elements will be formed by means of any conventional element and are therefore not shown in detail in the attached diagrams, the possibilities of adjustment simply being shown by axes and arrows in FIG. 1.

The loading system which enables the opposite forces to be exerted on the inner walls of the structure (FIGS. 1 and 2) is mounted in the central body (2,3,4,6,6bis and 7). This loading system essentially consists of a double-action long-stroke thrustor (7) which enables the elements (2) exerting the forces against the surface of the walls to be displaced and positioned and which is combined with an electronic force sensor (4) connected to a data-collection center (19 in FIG. 3) and which enables the applied forces to be read, stored and processed. This data-collection center (19) is mounted on a carriage (C2) (FIG. 3) and enables the applied forces, as well as the displacements and measured deformations produced by these forces, to be received, memorized and processed.

This center could possibly be connected directly to a computer in order to enable continuous processing, via the expert system which may be incorporated therein.

The loading system consists, as mentioned above, essentially of two large-surface loading shoes (2) actuated by a thrustor (7). This loading system is, as illustrated in the attached figures, in the form of two shoes enabling the forces to be applied whilst hugging part of the inner surface of the conduit to be tested. So as to enable the equipment to be adapted to the inside of conduits having different cross-sections, a sliding prop (6 and 6bis) fixed in the required position by a pin (12) is placed between the loading shoes and the loading system.

Such a loading system enables, by way of its guide, any position to be assumed inside the conduit so as to execute three types of movements, namely vertical movement, horizontal movement and rotational movement about a horizontal axis.

Measurement of the deformations and displacements which result from the forces exerted against the wall is performed by means of a unit designated by the general references (14 and 15) and which can be seen only in FIG. 3. This unit essentially consists of a system (14) for measuring the displacements and deformations in the horizontal direction and of a system (15) for measuring the displacements and deformations in the vertical direction. These two systems (14, 15) are essentially in the form of telescopic rods which may be fastened between two opposite points. These systems (14, 15) are equipped with electronic sensors (17) connected directly to the collection center (19). They are independent of the loading system and may be positioned arbitrarily and may be multiplied as desired.

If, in the example illustrated in FIGS. 1, 2 and 3, the measuring equipment is displaced manually, it may, of course, be envisaged to automate it, or even, when it is desired to perform checks in environments hostile to man, to produce a unit which may be guided by remote control. It will also be possible to envisage combining it with various accessories such as cameras, various probes, profile recording instruments ... .

It may also be envisaged to design a single carriage combining all the loading functions and the transport of the additional machinery (collection center, power ...) instead of two carriages (a main carriage for the loading and an additional carriage for transporting the machinery).

Such equipment may be used to perform diagnoses of the condition of structures having any type of profile (circular, square, rectangular, ovoidal ..). Such equipment is employed as follows.

After placing the equipment inside the conduit to be evaluated and adjusting this equipment, measurements are performed intermittently along the conduit. During these measurements, the forces are applied increasingly and then decreasingly and the said forces and the displacements which they generate are recorded automatically. The data (forces and displacements) are transmitted to the collection center for storing and processing by the expert system. Once the test is completed, the machine is moved to another zone in order to perform a second test.

Using the measurements taken, it is possible to make a diagnosis on the condition of the structure and to establish a law on its overall properties, taking into account its structure, its use and its immediate environment (earth, water ..). This law is input into a digital computational model which is the expert system enabling the system of the structure and its environment (generally earth) to be identified and is verified by a three-dimensional digital computational process enabling the degradations recorded during the testing (deformations, cracks, compression ...) to be explained. This first stage enables the explanation to be found for any degradations and its impact in terms of the use of the structure to be measured.

A second stage of the digital process consists in a multiparametric analysis enabling the parameter or parameters to be deduced which have the greatest influence with respect to the destruction of the structure (upper bound). This stage enables the evaluated line to be classified into zones at risk, and each of them corresponds to an operation which is definitive for the durability of the structure (inspection, reinforcement, reconstruction...). In the event of repair or reconstruction, a third stage based on a detailed simulation with finished elements enables the technique and repair materials adopted for the structure to be defined quantitatively and qualitatively.

Such an evaluation method is not only simple to implement but also enables the condition of the evaluated structure and the definition of any operations required for its maintenance to be determined accurately.

The invention is, of course, not limited to the embodiment described above but it covers all alternatives of it made within the same spirit.

We claim:

1. Apparatus for conducting non-destructive testing of an elongated conduit that includes:
    a carriage for movement along said conduit,
    a test bar having opposing ends, said test bar rotatably mounted on said carriage for movement in a plane perpendicular to a central longitudinal axis of said conduit,
    means for extending both ends of said bar into contact against an inner wall of said conduit to deform said wall,
    sensing means for measuring the amount of deformation produced by said bar and providing an output data signal indicative thereof, and
    memory means for storing the data signal information.

2. The apparatus of claim 1 that further includes processing means connected to the memory means for analyzing the stored information.

3. The apparatus of claim 1 wherein said test bar is a double action thruster having opposing ends and a movable element at each end thereof and a shoe at a distal end of each element for contacting the wall.

4. The apparatus of claim 1 wherein said sensing means includes a telescoping rod that is positionable parallel with the test bar against the wall of said conduit and means to measure displacement of the rod.

5. The apparatus of claim 1 wherein the test bar can be rotated through 90° of arc so that the wall can be deformed in both a vertical and horizontal direction.

* * * * *